Figure 1:
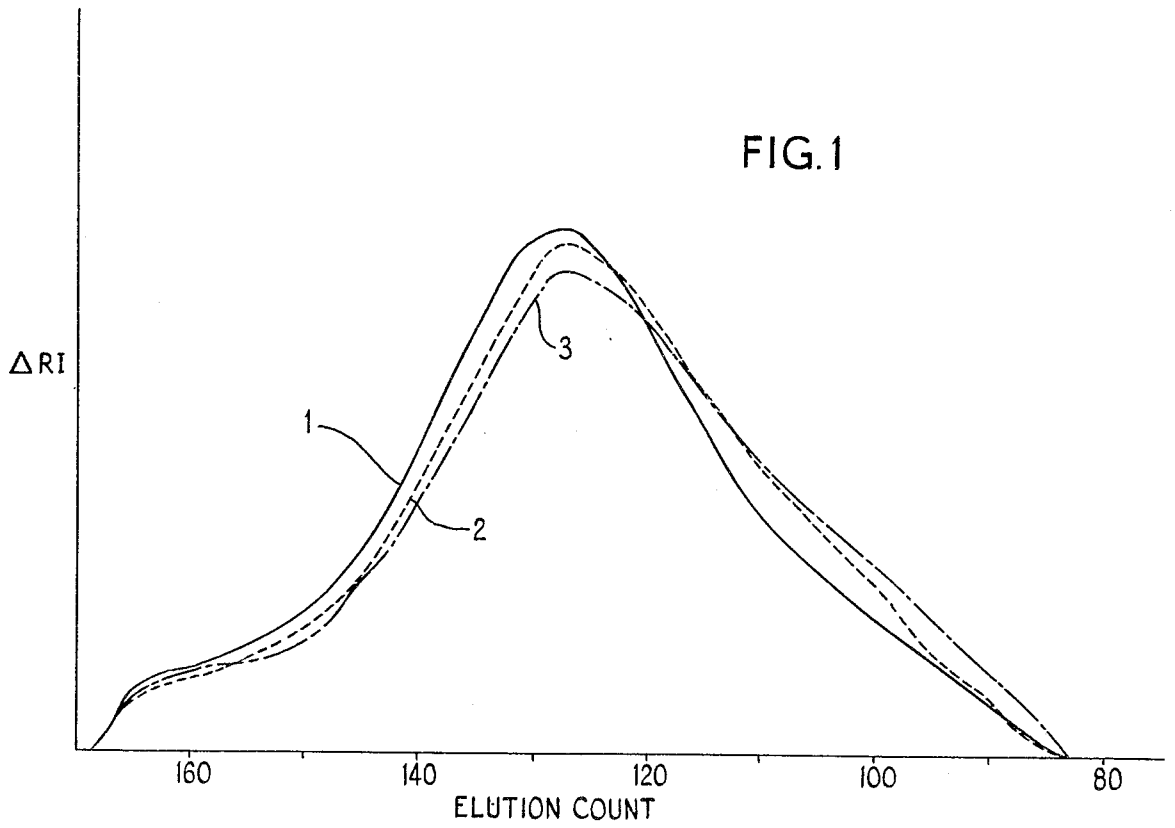
Figure 2:
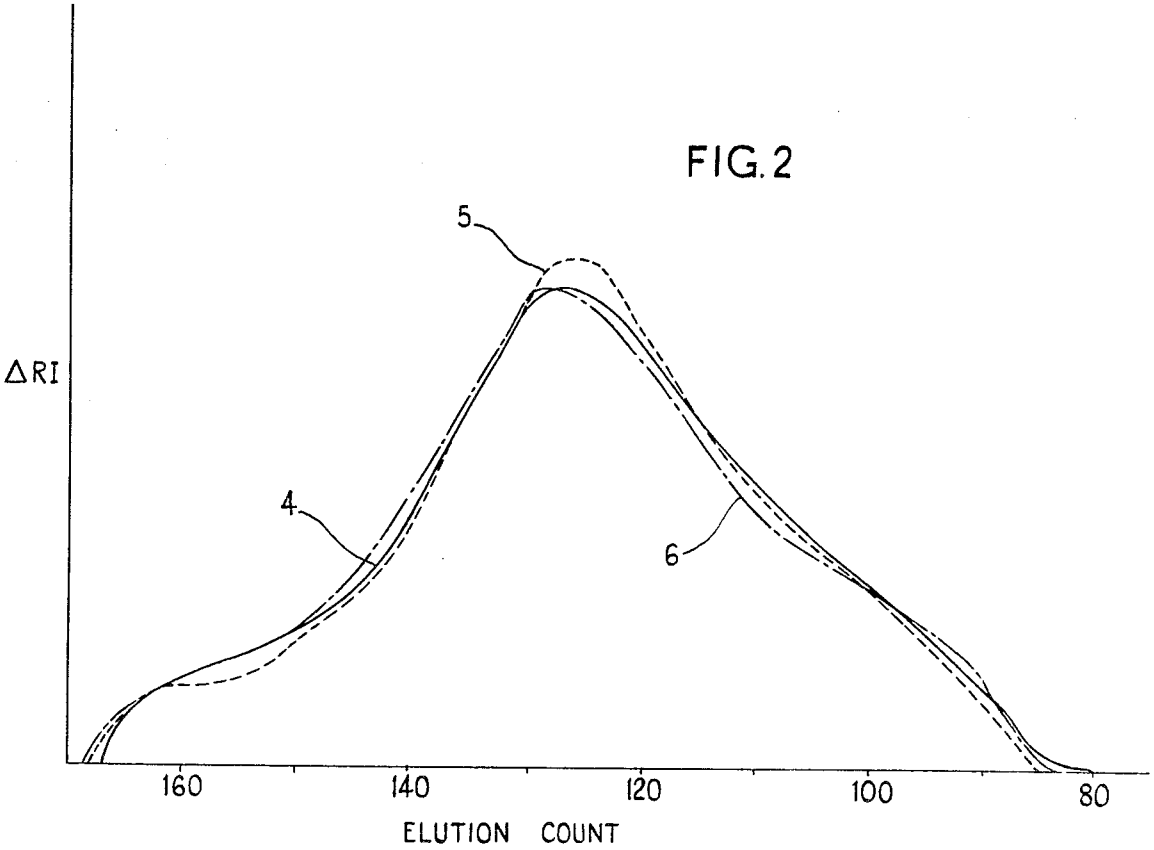
Figure 3:
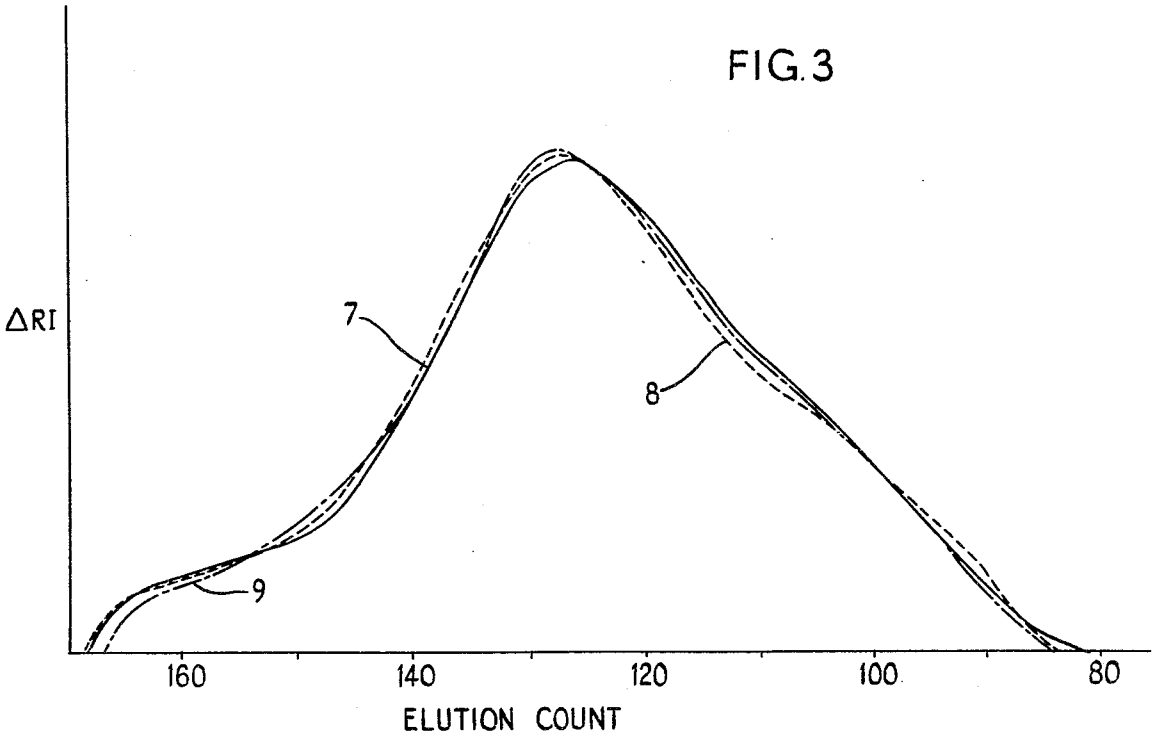
Figure 4:
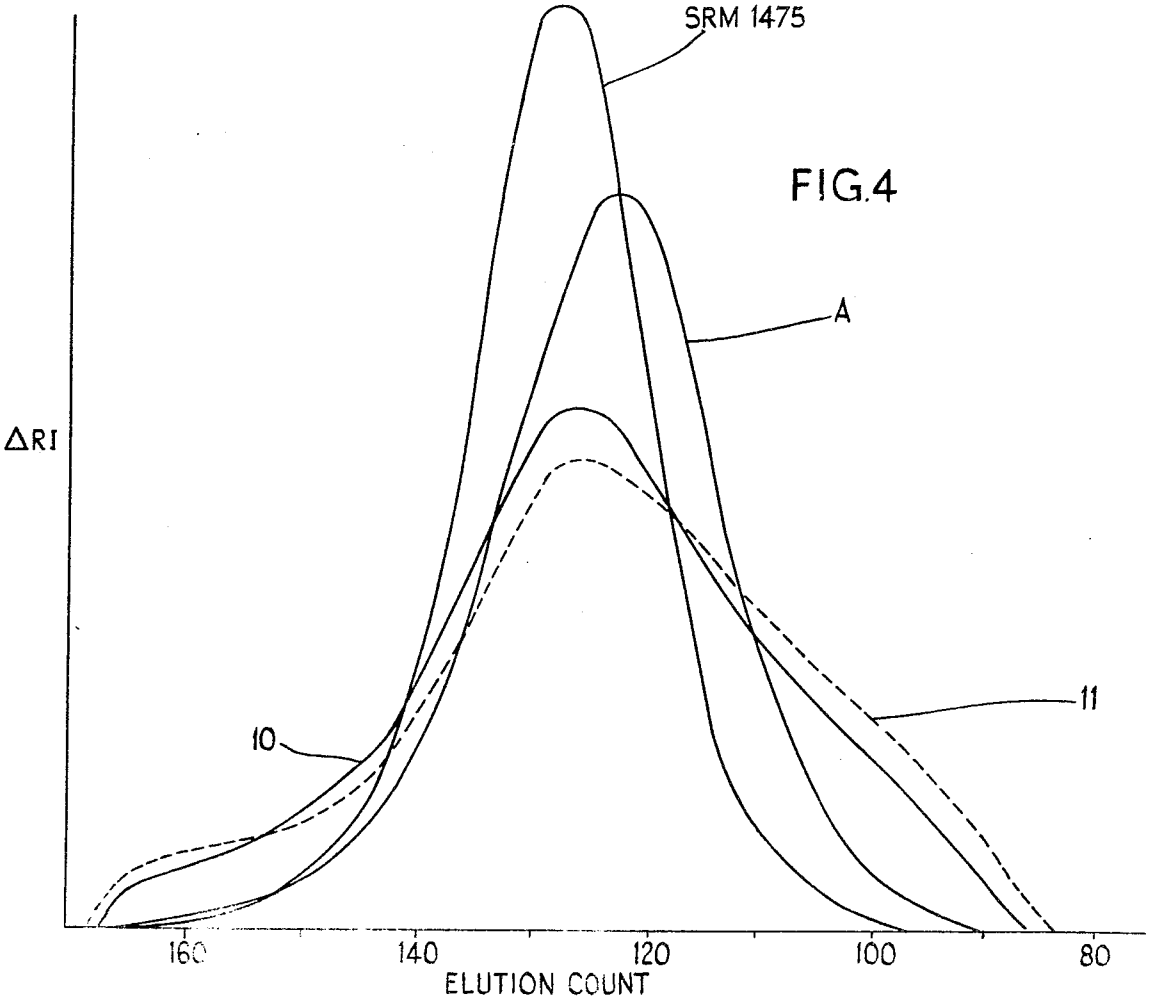

United States Defensive Publication [19] (H) [11] T956,004

Ballard et al. [43] Mar. 1, 1977

[54] ETHYLENE POLYMERS

[75] Inventors: Denis George Harold Ballard; Eric Jones; John Christopher Padget, all of Runcorn, England

[73] Assignee: Imperial Chemical Industries Limited, London, England

[21] Appl. No.: 664,984

[22] Filed: Mar. 8, 1976

[30] Foreign Application Priority Data

Mar. 7, 1975 United Kingdom ..... 9563/75

[51] Int. Cl.[2] ..... C08F 10/14

[52] U.S. Cl. ..... 526/350

[57] ABSTRACT

A copolymer of ethylene with at least one other mono-$\alpha$-olefine is prepared and is characterized as having a density in the range 918 to 940 Kg/m$^3$, an apparent viscosity (A) at 200° C and a shear rate of 100 sec$^{-1}$ of $0.5 \times 10^3$ to $3.0 \times 10^3$ Nsm$^{-2}$ and a viscosity at 200° C and a stress of $10^3$ N/m$^2$ of 2 $Ae^{(1.6A \times 10^{-3})}$ to 10,000 A.

The copolymer from which the film is formed is preferably one in which the comonomer contains at least 5 carbon atoms; the comonomer may contain up to 12 carbon atoms. Hexene-1 is the preferred comonomer and can be present in the copolymer in an amount of 6.5 to 16.5%, by weight.

The copolymers are readily processed and can be formed into films which combine good stiffness and good impact properties.

The copolymers are conveniently prepared using supported transition metal benzyl compounds followed by a total work-up of the polymerization mixture. In particular, a process for forming the copolymers includes copolymerizing ethylene and the comonomer in the presence of a transition metal olefine polymerization catalyst and separating a polymeric product having an annealed characteristic set forth above.

21 Claims, 4 Sheets Drawing,

49 Pages Specification

The file of this unexamined application may be inspected and copies thereof may be purchased (849 O.G. 1221, Apr. 9, 1968).